United States Patent [19]

Langner

[11] Patent Number: 5,374,444
[45] Date of Patent: * Dec. 20, 1994

[54] FIBER BEVERAGE AND METHOD OF MANUFACTURE

[76] Inventor: Bruce J. Langner, Suite 202, 107 Monmouth Rd., West Long Branch, N.J. 07764

[*] Notice: The portion of the term of this patent subsequent to Jan. 12, 2010 has been disclaimed.

[21] Appl. No.: 127,944

[22] Filed: Sep. 28, 1993

Related U.S. Application Data

[63] Continuation-in-part of Ser. No. 903,986, Jun. 24, 1992, Pat. No. 5,254,357, which is a continuation-in-part of Ser. No. 850,005, Mar. 10, 1992, Pat. No. 5,178,896, which is a continuation-in-part of Ser. No. 735,083, Jul. 24, 1991, abandoned, which is a continuation-in-part of Ser. No. 722,878, Jun. 28, 1991, abandoned.

[51] Int. Cl.5 .................................................. A23L 2/00
[52] U.S. Cl. ..................................... 426/590; 426/804
[58] Field of Search ............... 426/590, 573, 804, 578, 426/658

[56] References Cited

U.S. PATENT DOCUMENTS

| | | | |
|---|---|---|---|
| 3,294,552 | 12/1966 | Topalian | 426/658 |
| 3,615,701 | 10/1971 | Goss | 426/658 |
| 3,897,571 | 7/1975 | Homler et al. | 426/590 |
| 4,078,092 | 3/1978 | Nishiyama | 426/590 |
| 4,143,163 | 3/1979 | Hutcheson | 426/804 |
| 4,159,210 | 6/1979 | Chen et al. | 426/658 |
| 4,264,638 | 4/1981 | Sirett et al. | 426/590 |
| 4,311,717 | 1/1982 | McGinley | 426/590 |
| 4,459,315 | 7/1984 | Salo | 426/590 |
| 4,528,205 | 7/1985 | Turrisi | 426/658 |
| 4,680,189 | 7/1987 | Schumacher | 426/804 |
| 4,684,532 | 8/1987 | Izzo | 426/804 |
| 4,710,390 | 12/1987 | Schumacher | 426/804 |
| 4,786,521 | 11/1988 | Bennett et al. | 426/804 |
| 4,834,990 | 5/1989 | Amer | 426/804 |
| 4,915,970 | 4/1990 | Coffey | 426/578 |
| 4,927,649 | 5/1990 | Antenucci | 426/273 |
| 4,938,989 | 7/1990 | Steeves et al. | 426/658 |
| 4,959,466 | 9/1990 | White | 426/603 |
| 4,960,763 | 10/1990 | Stephens et al. | 426/804 |
| 5,087,471 | 2/1992 | Combes et al. | 426/573 |
| 5,178,896 | 1/1993 | Langner | 426/590 |
| 5,254,357 | 10/1993 | Langner | 426/590 |

FOREIGN PATENT DOCUMENTS

| | | | |
|---|---|---|---|
| 0317079 | 5/1989 | European Pat. Off. | 426/804 |
| 1959196 | 6/1971 | Germany | 426/804 |
| 2729370 | 5/1978 | Germany | 426/804 |
| 2079578 | 6/1981 | United Kingdom | 426/804 |

OTHER PUBLICATIONS

Lesser 1948 Cellulose Derivatives Drug and Cosmetic Industry May issue, pp. 612–614, 670, 671, 692–694 Jun. issue, pp. 750–752, 830–832.

Bactowsky et al 1950 The Bulletin American Society of Hospital Pharmacists Mar.–Apr. issue pp. 65–73.

Whistler 1959 Industrial Gums Academic Press New York pp. 565–594.

"Sugar–Free and Non–Glycogentic . . . Persons" by C. W. Bauer et al., pp. 296–301.

"Dow Produce Literature of Methocel Cellulose Ethers and Technical Handbook" dated Apr. 1988.

*Primary Examiner*—Carolyn Paden
*Attorney, Agent, or Firm*—Norman E. Lehrer; Franklyn Schoenberg

[57] ABSTRACT

A dietary fiber supplement in beverage and liquid concentrate liquid dosage forms wherein the dietary fiber source is cellulose ether. A method of making the dietary fiber supplement is also disclosed.

23 Claims, No Drawings

FIBER BEVERAGE AND METHOD OF MANUFACTURE

This is continuation-in-part of U.S. patent application Ser. No. 903,986, filed Jun. 24, 1992, now U.S. Pat. No. 5,254,357, which is a continuation-in-part of U.S. patent application Ser. No. 850,005, filed Mar. 10, 1992 now U.S. Pat. No. 5,178,896, which is a continuation-in-part of U.S. patent application Ser. No. 735,083, filed Jul. 24, 1991, abandoned, which is a continuation-in-part of application Ser. No. 722,878, filed Jun. 28, 1991, abandoned.

FIELD OF THE INVENTION

This application generally relates to dietary fiber, in particular to a fiber beverage and a method of making a fiber beverage.

BACKGROUND OF THE INVENTION

Dietary fiber is a term for a variety of plant substances that are resistant to digestion by human gastrointestinal enzymes. Dietary fiber supplements contain naturally occurring plant fiber such as psyllium, semi-synthetic fiber such as methylcellulose and the like cellulose ether derivatives of cellulose or synthetic fiber such as calcium polycarbophil.

Dietary fibers can be divided into two groups, based on their water solubility. The structural or matrix fibers, cellulose for example, are insoluble. The natural fibers, pectins for example, are soluble.

The addition of fiber to the human diet has attracted increasing interest in recent years as the shortcomings of the diets of western countries have become known. The current prevalence of diseases including diabetes, coronary heart disease, colorectal cancer and gastrointestinal disorders such as constipation, hemorrhoids and diverticular disease, are associated with, among other things, diets containing more fat and less fiber.

It has been suggested that increasing dietary fiber intake may help prevent many diet-related disorders and/or mitigate their course. The American Diabetes Association and National Cancer Institute recommend diets high in fiber and complex carbohydrates and low in fat. Physicians and pharmaceutical companies have attempted to correct the deficiency of dietary fiber with products that struggle to achieve this purpose.

Because Westernized diets are made up of so many highly processed, low-fiber foods, it takes a concerted effort to begin a high-fiber dietary habit. However, it must be remembered that it is extremely difficult for most people to make major changes in eating habits. Therefore, the use of dietary fiber supplements is becoming more widespread.

Currently available fiber supplements include Metamucil ®, which contains psyllium as the active ingredient; Citrucel ®—a methylcellulose composition supplied in powder form; Fibercone ®, which contains calcium polycarbophil as the fiber source.

U.S. Pat. No. 4,988,530 to Hoersten et al. is drawn to a beverage containing pectin having a degree of esterification of at least 50%. Hoersten et al. discloses the two groups of dietary fiber, insoluble fiber and soluble fiber, and identifies the problems associated with using each group as a fiber source in food products. When incorporated into liquid food formulations, the insoluble dietary fibers are difficult to maintain in proper suspension or dispersion and tend to settle to the bottom of drinks and beverages. Additionally, the insoluble dietary fibers provide the liquid foodstuffs with a gritty texture and are not particularly pleasant tasting.

Because of their solubility, the soluble dietary fibers do not have a gritty texture associated with their use. The soluble fibers, however, tend to thicken liquid products and can affect the original sensory mouthfeel of the unmodified liquid. The Hoersten et al. patent also recognizes the obstacles in the use of carboxylmethylcellulose as a liquid dietary supplement. The addition of carboxymethylcellulose to water or juice was thought to require prompt consumption or the solution would result in thickening to the consistency of partially set gelatin or wallpaper paste.

Additional related art includes U.S. Pat. No. 3,455,714 which discloses cellulose derivatives with a water soluble cellulose ether coating to improve the dissolution of insoluble cellulose fibers in water, however, a beverage or liquid form of the water-soluble composition is not disclosed; and U.S. Pat. No. 4,321,263 discloses coating psyllium with a polyethylene glycolpolyvinyl pyrrolidone composition also to improve dispersability of psyllium in water.

Accordingly, there exists a need for a dietary fiber supplement available in a liquid dosage form, containing methyl cellulose or the like soluble cellulose ether derivatives of cellulose, thus making the addition of fiber to one's diet pleasant tasting and effective.

BRIEF DESCRIPTION

This invention comprises a dietary fiber supplement and method of making the supplement. The invention comprises water soluble cellulose ethers including, for example, methylcellulose, supplied in liquid dosage form in an amount in the range of from about 0.3 weight percent to about 4.5 weight percent and preferably from about 0.5 weight percent to about 1.7 weight percent. The supplement is available in liquid dosage form as a beverage for consumption as a dietary fiber supplement, as well as a liquid concentrate which can be readily diluted by a consumer to provide the desired dietary fiber supplement in beverage dosage form.

The method of making the supplement is another aspect of the invention. The method of making the beverage and the liquid concentrate include dispersing a fiber source in water and maintaining the fiber in solution such that the supplement is supplied in liquid form to consumers. The method of making the beverage in individual beverage dosage form includes a heating and cooling treatment while the method of making the concentrate is carried out at room temperature.

DETAILED DESCRIPTION OF THE INVENTION

It is an object of the current invention to provide a dietary fiber supplement to be supplied in liquid dosage form to consumers. The liquid dosage form of the supplement may be a beverage, or alternatively a liquid syrup concentrate. When the liquid dosage form is a beverage, the amount of a cellulose ether dietary fiber supplement such as methylcellulose therein is about 0.5 weight percent per serving (10 ounces); the concentrate composition includes about 1.7 weight percent of the cellulose ether dietary fiber supplement such as methylcellulose. Each beverage serving of the fiber supplement prepared from the concentrate composition provides about 0.5 weight percent per serving of a cellulose ether fiber supplement such as methylcellulose.

This invention provides the direct liquid form dietary fiber supplement product in two forms: as a liquid concentrate to be diluted prior to consumption; and as an individual serving size, packaged liquid product for immediate drinking. The two products are prepared by somewhat different processes.

One aspect of this invention provides a process for preparing a dietary fiber supplement liquid, water-dilutable concentrate composition containing about 1.0 to about 4.5 percent and preferably to about 2.3 percent w/w of a water soluble cellulose ether fiber as described hereinafter in greater detail which involves mixing the water soluble cellulose ether in powder form with a pharmaceutical or food grade of a high density liquid diluent such as high fructose corn syrup, olive oil, vegetable oil or glycerine, preferably high fructose corn syrup, in proportions of from about 1 to about 4 parts by volume of the liquid diluent to 1 part by weight of the cellulose ether and in an amount sufficient to provide the concentrate composition being prepared with a concentration of from about 1.0 to about 4.5 percent and preferably to about 2.3 percent w/w of the cellulose ether in the finished liquid concentrate. The high density liquid diluent and cellulose ether components are mixed at a stirring rate of from about 200 to 1000 RPM, preferably from about 250 to 500 RPM, and more preferably from 300–400 RPM for a time sufficient to obtain a substantially uniform mixture of the cellulose ether with the liquid diluent. Usually, about 10 minutes is sufficient. Other additives such as flavoring materials, acidulants, heat, light and/or color stabilizer materials, either as such, or diluted with water, can be added to this cellulose ether/liquid diluent mixture with stirring at essentially the same mixing rate. Usually a preservative, such as sodium benzoate can be added to the concentrate composition at this time in an amount to effectively sterilize the concentrate. Then, while continuing to stir the mixture at from about 200 to 1000 RPM, preferably at from about 250–500 RPM, the resulting mixture is mixed and diluted with cold (about 40° to 50° F.) water in an amount and for a time sufficient to provide the resulting concentrate composition with a concentration of cellulose ether such that, usually after packaging and shipping, when the concentrate formulation is diluted with about 3 parts of water by volume per each volume part of the concentrate composition, the thus diluted concentrate will provide a beverage form composition which will contain about from about 1 to 4 grams, preferably 1.5 grams of the cellulose ether fiber in a concentration from about 0.3 to 1.3 weight percent preferably from about 0.45 to about 0.55 weight percent, e.g., about 0.485 percent weight/weight, per 10 ounce serving of the resulting beverage strength composition.

Individual serving size packaged containers of the dietary fiber supplement, aqueous beverage compositions of the invention can be prepared somewhat differently than how the concentrate composition is prepared. This invention provides a process for preparing individual serving size packages of the dietary fiber supplement liquid/beverage composition which contains from about 0.3 to about 1.3 and preferably from about 0.45 to about 0.55 weight/volume percent of a water soluble cellulose ether fiber herein described and in a sufficient individual serving volume size of the aqueous beverage composition to provide from about 1 to about 4 grams and preferably from about 1 to 2 grams of said cellulose ether fiber per 10 ounce liquid serving.

In accordance with the practice of the invention, the water soluble cellulose ether is added to and mixed into a stirred high density liquid diluent as exemplified above, but preferably high fructose corn syrup, in proportions of from about 1 to about 4 parts by volume of the high density liquid diluent per part by weight of the cellulose ether while agitating as by stirring in a vessel at a rate of from about 200 to about 1000 RPM, preferably at a rate of about 250 to about 500 RPM and more preferably at 300 to 400 RPM while maintaining the mixture at a cold temperature to room temperature for a time sufficient to form an essentially uniform mixture. Usually stirring for about 10 minutes is sufficient. While continuing to maintain essentially the same stirring or agitation rate, other desired additives such as flavoring, acidulant, preservatives, antioxidants and flavor or color stabilizers can be added, either as such or by being first diluted with water, until a uniform consistency of the mixture is obtained. Usually, stirring the mixture at this rate for up to 10 minutes for each additive is sufficient. Then, cold water (about 40°–50° F.) is added with stirring as above noted in a volume sufficient to dilute the mixture to provide the final composition with the desired beverage concentration of from about 3.0 to 13, preferably 4.5 to 5.5, weight/volume percent of cellulose ether fiber in the beverage liquid batch.

After any desired sample testing of the batch beverage composition, the bulk beverage composition is then packaged into individual serving size containers, and pasteurized, e.g., either by known bulk flash heating in coiled pipes, or the like, treatment processes, but more commonly by passing the beverage containers through a heating line to heat the beverage contents to about 156°–158° F. for a time, usually about 10 to 15 minutes, sufficient to sterilize the beverage liquid contents in the containers. Thereafter, particularly if the beverage had been flash heated in bulk to pasteurize the product, the beverage liquid containers are cooled either in a refrigerator or a freezer. In a refrigerator, the beverage packs should be cooled to at least 50° F. for about eight hours or in a freezer compartment for two or four hours. These process operations stabilize the shelf storage of the beverage in single serving containers for up to about two years of acceptable product life.

While, as indicated, the beverage composition of the invention can be provided in a single serving container, the liquid concentrate is advantageous in that it furnishes multiple servings per container and decreases the amount of shelf space needed for storage. The liquid concentrate composition of the invention is diluted with water such that the amount of cellulose ether fiber is from about 0.3 to about 1.3 and preferably about 0.5 weight percent per serving (10 ounces). The non-concentrate beverage, after opening, should be consumed within about a 24-hour period.

The fiber supplement beverage composition of the present invention overcomes the disadvantages of currently available fiber supplements by providing a substantially uniform mixture and preferably solution of a soluble liquid fiber product directly to consumers. Presently available fiber supplements are only available as tablets and powders, which when prepared for consumption result in gritty, coarse mouthfeel. One embodiment of the instant invention is provided as a liquid concentrate composition requiring the addition of a liquid diluent such as water before consumption. The cellulose ether fiber component herein described such as 400 grade methylcellulose or the like provides a fiber supplement beverage composition of a viscosity such that thickening does not result and is accompanied by an agreeable, pleasant taste.

The active or bulking agent of the supplement are water soluble cellulose ether derivatives of cellulose of a viscosity grade rating which in an aqueous solution will exhibit a readily consumable viscosity at room temperature or lower and will not cause the viscosity of the solution to increase substantially after extended periods of storage. Cellulose ether products suitable for use in preparing the dietary supplementary fiber beverage of the invention are available in two basic types: methylcellulose and hydroxypropyl methylcellulose. All the above cellulose ether products are available in a powder form which is water soluble. Cellulose ether products thicken aqueous solutions, the viscosity of the aqueous solution being related to the specific cellulose ether molecular weight, chemical type and concentration. Cellulose ether products suitable for use in accordance with the invention are those grades which in a 2 percent concentration in water afford a viscosity which ranges from 3 to about 1500 cps. and preferably between about 50 and 1000 cps. Cellulose ether products of the same substitution type can be blended to obtain the desired viscosity. Cellulose ether products are available from Shin-Etsu, Japan, and Dow Chemical Company, Midland, Mich. Because the suitable cellulose ethers are water soluble and the viscosity of the solution is low, the fiber supplement is a liquid, not a colloidal suspension. For example, 400 grade methylcellulose is water soluble and results in a solution of low viscosity. Cellulose ethers of 400 grade viscosity have been found to substantially reduce aftertaste and coarseness or "mouthfeel" of the fiber supplement prepared therefrom, thus rendering a pleasant taste to the beverage.

Exemplary suitable water soluble cellulose ethers include food and drug quality methylcellulose and hydroxypropyl methylcellulose products of a viscosity grade rating of from 3 to about 1500 cps. although, as indicated, cellulose ether products of the same substitution type and of higher or lower viscosity grade ratings can be blended to obtain the desired viscosity.

The dietary supplementary beverage of the invention contains methylcellulose or other cellulose ethers in an amount in the range of from about 0.3 to 1.3 weight percent, preferably 0.45 to 0.55 weight percent, per serving. Further, the amount of cellulose ether must be sufficient to provide at least about one gram of fiber per ten ounce serving, preferably from one to four grams, and most preferably, about 1.5 grams of fiber per ten ounce serving.

The dietary fiber supplement of the invention also contains water and a high density liquid diluent such as olive oil, vegetable oil, glycerine and preferably fructose corn syrup, and may contain at least one antioxidant, at least one acidulant to adjust pH for pleasant mouthfeel, and a flavoring stabilizer. The liquid dietary fiber supplement concentrate composition of the invention contains a preservative such as sodium benzoate and the like. The antioxidant may be selected from the group consisting of ascorbic acid, BHA (butylated hydroxyanisole), BHT (butylated hydroxytoluene) and the like; the acidulant may be selected from the group consisting of citric acid and sodium citrate; and the flavoring stabilizer may be acacia, for example.

A natural flavoring additive may also be added to the fiber supplement and may be selected from the group consisting of lemon, lime, grapefruit, orange, tomato, pineapple, grape, peach, pear, cherry and the like. Orange flavoring provides a shelf life of at least about six months. Other flavoring additives include apple, cranberry, prune and the like which provide a shelf life of at least about two years.

The fiber supplement may also contain one or more of the following ingredients: orange juice concentrate, FD&C yellow #5, FD&C yellow #6. Each ten ounce serving contains about 140 calories and is low in sodium. A low calorie concentrate of the fiber supplement or the current invention contains only about one calorie per serving.

In addition to at least one gram of fiber, the fiber supplement of the present invention provides the following nutrition per serving (in grams) as set forth in Table 1:

TABLE 1

| protein | <1 |
|---|---|
| carbohydrate | 35 |
| fat | <1 |
| sodium | 0.1 |
| potassium | 0.14 |

Table 2 sets forth the percentages of U.S. recommended daily allowances of ingredients in the fiber supplement of the current invention.

TABLE 2

| vitamin C | 210% |
|---|---|
| thiamine | 2% |
| protein | <2% |
| vitamin A | <2% |
| riboflavin | <2% |
| niacin | <2% |
| calcium | <2% |
| iron | <2% |

The liquid concentrate form of the fiber supplement is adapted to convert to the beverage form upon the addition of a sufficient amount of water to provide at least one gram of fiber per ten ounce serving, preferably from one to four grams, and most preferably about 1.5 grams. Preferably, the mixture ratio of the liquid concentrate composition to water is 1:3, for example, two ounces of concentrate to six ounces of water, in the resulting beverage form.

More recently, we have decided that preparation, packaging and dispensing of a concentrate composition package, with instruction for the patient to dilute the concentrate composition with four volumes of water per volume of concentrate to deliver the same beverage end product amount of cellulose ether fiber such as grade 400 methylcellulose fiber per 10 ounce serving would be more advantageous. An example of a concentrate formulation which is intended for dilution 1:4 is set forth hereinbelow in Table 7. Preparation of a concentrate composition dilutable in a ratio of 1:5 and 1:6 of concentrate:water, by volume are also provided in Tables 8 and 9.

As indicated, the method of making the individual liquid beverage dosage form of the instant fiber supplement is a "cold-hot-cold" process. High fructose corn syrup solution is placed, under agitation, in a tank at a temperature of less than or equal to room temperature. All of the following steps require agitation at rates herein described during the addition of the ingredients and for about ten minutes after each ingredient addition, unless otherwise noted. The cellulose ether such as 400 grade methylcellulose or the like in powder form is added to the high fructose corn syrup, thus creating a high fructose corn syrup-methylcellulose, hereinafter HFCS-MC, solution. Cold water at a temperature of about 50° F. or less is added to the HFCS-MC solution. The antioxidants and acidulants are individually dissolved into the HFCS-MC solution. The natural flavors are then added.

The HFCS-MC solution is packaged into individual containers and tunnel pasteurized at about 156°-158° F. for a period of time in the range of 10-15 minutes to sterilize the solution and is immediately cooled to a temperature of about 50° F. for example, by refrigeration, freezing or the like. The last cooling step takes approximately eight hours by refrigeration, or two to four hours by freezing.

The liquid concentrate composition form is produced as indicated by a method which does not involve heat sterilization. The method of making the liquid concentrate composition is performed at less than or equal to room temperature. All of the following steps require agitation during the addition of the ingredients and for about ten minutes after each ingredient addition, unless otherwise noted. The cellulose ether such as 400 grade methylcellulose or the like is first dispersed with stirring at 200 to 1000 RPM, preferably at about 300 to 400 RPM for about 10 minutes in high fructose corn syrup solution, resulting in a high fructose corn syrup-methylcellulose, hereinafter HFCS-MC solution. Antioxidants and acidulants are dissolved in water and then added to the HFCS-MC solution. Preservatives are dissolved in water and then added to the HFCS-MC solution. Alternatively, sodium citrate acidulant may be added to the HFCS-MC solution with the preservatives. The natural flavors are then added.

It has been found according to this invention that it is advantageous to agitate these mixtures using stirrer speeds approximating between about 200 and 1000 RPM, preferably about 300-400 RPM in standard pharmaceutical production size mixing tanks for about 10 minutes to obtain the best wetting and distribution of the cellulose ether of suitable viscosity in the liquid mixture for long-term shelf stability storage. Lower speed stirring, say, at 50 to 200 RPM or hand mixing is unable to adequately disperse the cellulose ether such as 400 grade methylcellulose sufficiently to produce acceptable liquid products in terms of appearance, degree of cloudiness, tactility (feel) degree of oral grittiness property and amount of solid sediment or gel in the liquid product after packaging and standing. Similarly, extreme high speed mixing of the 400 grade methylcellulose/HFCS mixtures stirred at high RPM speeds, e.g. on the order 2000 to 2300 RPM produce large volumes of foam and solid particles which separate from liquid medium which particles settle when the mixture is allowed to stand.

Viscosity grades of cellulose ether having viscosity ratings higher than 1500 cps produce products which are found to be too viscous, provide an unacceptable degree of cloudiness, leave too much sediment or gel to provide acceptable liquid products.

It has been found according to this invention that the choice of a cellulose ether grade such as 400 grade methylcellulose or the like for these dietary fiber supplement compositions when used with the correct stirring rate as herein described provided a unique shelf-stable liquid beverage product that once cooled in preparation, the cellulose ether/HFCS aqueous beverage product of this invention, upon reheating to ambient temperatures will remain stable for up to about 2 years, rather than form a gel or precipitate.

If desired, the aqueous liquid form cellulose ether/HFCS products of this invention can also be mixed with food or pharmaceutical grade of ethyl alcohol in proportions up to about 50:50, by volume of the ethanol if desired, to accommodate inclusion of other alcohol soluble medicaments, taste materials or coloring agents (stabilizers, and the like) without affecting the stability of the cellulose ether in the resulting dietary fiber compositions.

The following examples provide fiber supplement compositions of the instant invention in liquid dosage beverage and concentrate forms produced by the methods of the instant invention, but are not intended to and should not be construed as, placing any undue limitations on the invention as claimed.

Table 3 sets forth an example of a preparation of the fiber supplement beverage of the claimed invention:

TABLE 3

| Ingredient | Amount |
|---|---|
| Beverage | |
| HFCS - 42 @ 71° | 99.06 gallons |
| Methocel A4C | 42.328 lbs. |
| Water | 866.06 gallons |
| Sodium citrate F.C.C. | 13.125 lbs. |
| Citric Acid, Anhydrous F.C.C. | 24.75 lbs. |
| No. 404782 Naturally Flavored Orange Screwdriver Flavor | 37.5 gallons |
| Ascorbic Acid, F.C.C. | 0.84 lbs. |
| Total Finished Beverage | 1000 Gallons |

Finished Beverage Brix Value = 12.0
Methylcellulose: 1.5 gram/10 fluid ounce serving
Methocel A4C = methylcellulose of 400 cps viscosity rating
Legend: HFCS-42 = High Fructose corn syrup, The high fructose corn syrup solution was placed in a tank with the mixer below the surface of the solution. The methylcellulose was added, creating a HFCS-MC solution after stirring the resulting mixture at about 350 RPM for about ten minutes of agitation. The antioxidant and ascorbic acid, was added, followed by the addition of water to form the concentrate together with or after the addition of the acidulants, citric acid and sodium citrate, and the natural orange flavoring under constant agitation at about 350 RPM. The HFCS-MC solution is packaged into individual containers and tunnel pasteurized at about 156°-158° F. for a period of time in the range of 10-15 minutes to sterilize the solution and is immediately cooled to a temperature of about 50° F. by refrigeration, freezing or the like. The last cooling step takes approximately eight hours by refrigeration, or two or four hours by freezing.

Table 4 sets forth an example of a preparation of the fiber supplement concentrate of the claimed invention:

TABLE 4

| Ingredient | Amount |
|---|---|
| 1-3 Concentrate | |
| HFCS-42 | 39.624 gallons |
| Methocel A4C | 16.9312 lbs. |
| Water | 45.4166 gallons |
| Sodium citrate F.C.C. | 5.2498 lbs. |
| Citric Acid, Anhydrous, F.C.C. | 9.9888 lbs. |
| No. 404782 Orange Screwdriver | 15 gallons |
| Ascorbic Acid, F.C.C. | 0.3386 lbs. |
| Sodium Benzoate, F.C.C. | 0.4949 lbs. |
| Yield | 100 Gallons |
| Solids | |
| HFCS-42 | 315.8825 lbs. |
| Methocel | 16.9312 lbs. |

TABLE 4-continued

| Ingredient | Amount |
|---|---|
| Sodium Citrate, F.C.C. | 3.2498 lbs. |
| Citric Acid | 9.8999 lbs. |
| #404782 | 70.4769 lbs. |
| Ascorbic Acid | 0.3386 lbs. |
| Sodium Benzoate | 0.4949 lbs. |
| | 419.2738 |

Brix value of concentrate = 42.4
Diluted (1:3) Brix value = 12.0
Sodium Benzoate Content of Concentrate = 1/20 of 1%

Methylcellulose in powder form was added to the high fructose corn syrup at room temperature under agitation at about 350 RPM for about 10 minutes. The antioxidant, ascorbic acid and acidulants, sodium citrate and citric acid, were added, followed by the addition of sodium benzoate and the orange screwdriver flavoring.

A further example of a formulation recipe to make a concentrate composition of this invention is set forth in Table 5.

TABLE 5

| HFCS | 50.572 gallons |
|---|---|
| Methocel AYC Premium | 16.9312 lbs. |
| Water | 44.428 gallons |
| Citric Acid, Anhydrous, F.C.C. | 7.936 lbs. |
| Sodium Benzoate, F.C.C. | 0.495 lbs. |
| Flavoring Material | 5.000 gallons |
| (orange screwdriver) | |
| Yield | 100.000 gallons |
| SOLID | |
| HFCS-42 | 403.1599 lbs. |
| Methocel | 16.9312 lbs. |
| Citric Acid | 7.9360 lbs. |
| Sodium Benzoate | 0.4950 lbs. |
| TOTAL | 428.5221 lbs. |

BRIX = 42.06°
DILUTRO 1 + 3 = 4 = 12.01°
SODIUM BENZOATE CONTENT OF CONCENTRATE = 1/20 OF 1%

In use, it is contemplated that this concentrate composition would be diluted with water in proportion of 1 part of the concentrate to 3 parts of water, by volume. This concentrate has no ascorbic acid because we do not wish to affect the taste of the synthetic orange flavor used in these formulations.

The following table 6 presents and compares the gram amounts and percent by weight of 400 grade methylcellulose (Methocel ® brand) in grams of 400 grade methylcellulose per 10 oz. serving of the beverage strength liquid supplement (concentrate percentage of 400 grade methylcellulose shown before and after dilution of concentrate with water in proportions of 1 part by volume of concentrate with 3 parts by volume of water), and the percent by weight of the 400 grade methylcellulose in the desired diluted beverage product from either the concentrate or beverage product.

TABLE 6

| | 400 Grade Methylcellulose (Methocel ® Brand) Content | | |
|---|---|---|---|
| Product Type | Methocel Content per 10 fl. oz. Serv. | Methocel w/w in Concentrate | Methocel % w/w in Finished Bevg. |
| Concentrate | 1.0 | 1.14% | 0.3235% |
| Concentrate | 1.5 | 1.71% | 0.485% |
| Concentrate | 2.0 | 2.28% | 0.64707% |
| Beverage | 1.0 | | 0.325% |
| Beverage | 1.5 | | 0.485% |

TABLE 6-continued

| | 400 Grade Methylcellulose (Methocel ® Brand) Content | | |
|---|---|---|---|
| Product Type | Methocel Content per 10 fl. oz. Serv. | Methocel w/w in Concentrate | Methocel % w/w in Finished Bevg. |
| Beverage | 2.0 | | 0.64707% |

1 gallon of 1:3 ratio concentrate syrup = 9.9 lbs/gallon
1 gallon of 12.0° Brix finished beverage = 8.722 lbs/gallon Presently, we are using the orange screwdriver natural flavoring but we contemplate that the flavor may be changed to partial or full synthetic orange or other flavoring as our experience and taste preferences of users of these compositions are changed.

The fiber supplement of the current invention increases the volume of the intestinal contents by a number of mechanisms. The fiber supplement adds bulk, and thus differs from laxatives, because it is not digested and because methylcellulose and the like cellulose ethers hold water, swelling upon the absorption of water. It also increases bacterial mass due to fermentation and exerts mechanical effects by way of increased peristalsis (intestinal movement or churning).

As such, the fiber supplement of the current invention is useful as a first line of therapy for hemorrhoids. The claimed supplement increases fiber in the diet and thus aids in the management of irritable bowel syndrome and diverticulosis. It is also helpful to children and adults who need help in naturally regulating their bowel habits from constipation and diarrhea. The fiber supplement may also confer protection from hiatal hernia formation and colon cancer and breast cancer.

In addition, this invention also provides more concentrated liquid fiber supplement concentrate compositions which were formulated to determine a reasonable practical limit of the degree of concentrate concentration of the cellulose ether fiber and the high density liquid diluent and other additives, which can be adapted to a convenient, practical concentrate container and still be adapted to convert easily to the beverage form of the product upon the addition of the instructed amount of water. These additional concentrate forms of the product can still provide the desired beverage concentration of at least one gram of cellulose ether fiber such as 400 grade methylcellulose or the like per 10 ounce serving of the beverage form, preferably from one to four grams, most preferably 1.5 to 2.0 grams of the cellulose ether fiber per 10 ounce serving of the beverage form of the product when diluted as instructed on the concentrate package label. All of these concentrate formulations are intended to be diluted with from at least 3 volumes of water per volume of the packaged concentrate up to the volume limit which provides practical acceptability in terms of dosage and taste acceptability to the patient. As a practical matter, we have made concentrate formulations which can be diluted with from about 3 to about 6 volumes of water per volume of concentrate, as would be on the package label, and still have acceptable taste, mouth feel and general acceptability.

To test and illustrate more concentrated forms of the concentrate product, liquid concentrate compositions were prepared for use according to instructions for dilution at volume/volume ratios of the concentrate composition to water of 1:4, 1:5 and 1:6 to still obtain a beverage form of cellulose ether fiber such as the product having at least the one gram of cellulose either such as grade 400 methylcellulose fiber per 10 ounce serving of the beverage form of the product. With these concentrate formulations and with these indicated dilution ratios, the solubility of the methylcellulose fiber was achieved at all these ratios without altering the fiber quantity or the mouthfeel of the finished beverage product or solubility of the methylcellulose fiber therein.

Further concentration of the concentrate form of the product would necessitate a further reduction of water from the concentrate formulation (assuming the brix number/percent solids remained unaltered) for any further dilution amount by the consumer and would make both the concentrate composition and any resulting beverage form of the product unsuitable for uniform composition preparation and use. The only way to achieve a concentrate form of the product having a higher concentration of the concentrate formulation solids would be to change the percent of solids (syrup brix number) which would result in a thin, dilute flavor of the resulting more dilute beverage form of the product which would be unacceptable for public acceptance.

Tables 7, 8 and 9 hereinbelow set forth examples of concentrate formulations of this invention which can be diluted with 4, 5 and 6 volumes of water, respectively, per volume of the respective concentrate formulation, as the patient would be instructed to do, to make the respective beverage form of the product, before consuming that respective beverage form product. These resulting beverage forms are designed to provide the same beverage end product amounts of methylcellulose fiber as do the beverage formulations made from concentrates described hereinabove which are to be diluted with three volumes of water per volume of concentrate. Also, these additional concentrate formulations are made using the same stirring rates and times as are those indicated hereinabove for the concentrate products which are made for dilution with three volumes of water per volume of concentrate.

TABLE 7

| 1-4 Concentrate | |
|---|---|
| Ingredient | Amount |
| HFCS - 42 @ 71° | 61. gallons (U.S.) |
| Methocel A4C Premium (Methylcellulose 400) | 21.164 lbs. (avoir.) |
| Water | 35.40 gallons |
| Sodium Citrate, Anhydrous FCC | 6.56 lbs. |
| Sodium Benzoate FCC | 0.514 lbs. |
| Citric Acid, Anhydrous FCC | 9.94 lbs. |
| No. 422921 Orange Cloud ® Flavor | 1. gal. (36.5 fl. ozs.) |
| Yield | 100 gallons |

Syrup Brix 50.95
Syrup Refractometer Brix 50.18
Sodium Benzoate content of Concentrate = 1/20 of 1%

This concentrate formulation, when diluted with 4 volumes of water per 1 volume of the concentrate, as instructed, will provide about 1.5 gram of methylcellulose per 10 ounce serving.

A concentrate formulation, such as this formulation, to be diluted about 1:4 with water is a preferred embodiment of the concentrate composition of this invention.

TABLE 8

| 1:5 Ratio Concentrate | |
|---|---|
| Ingredient | Amount |
| HFCS - 42 71° | 61. gallons (U.S.) |
| Methocel A4C Premium (Methylcellulose 400) | 21.164 lbs. (avoir.) |

TABLE 8-continued

| 1:5 Ratio Concentrate | |
|---|---|
| Ingredient | Amount |
| Water | 18.73 gallons |
| Sodium Citrate, Anhydrous FCC | 6.56 lbs. |
| Sodium Benzoate FCC | 0.445 lbs. |
| Citric Acid, Anhydrous FCC | 9.94 lbs. |
| No. 422921 Orange Cloud ® Flavor | 1. gallon, (36.5 fl. ozs.) |
| Yield | 83.333 gallons |

Syrup Brix (not determined)
Syrup Refractometer Brix (not determined)
Sodium Benzoate content of Concentrate = 1/20 of 1%

Upon dilution, 5 volumes of water to 1 volume of this concentrate, a 10 ounce serving will provide about 1.5 grams of methylcellulose per 10 ounces of beverage.

TABLE 9

| 1:6 Ratio Concentrate | |
|---|---|
| Ingredient | Amount |
| HFCS - 42 71° | 61. gallons (U.S.) |
| Methocel A4C Premium (Methylcellulose 400) | 21.164 lbs. (avoir.) |
| Water | 6.836 gallons |
| Sodium Citrate, Anhydrous FCC | 6.56 lbs. |
| Sodium Benzoate FCC | 0.395 lbs. |
| Citric Acid, Anhydrous FCC | 9.94 lbs. |
| No. 422921 Orange Cloud ® Flavor | 1. gal. (36.5 fl. ozs.) |
| Yield | 71.4285 gallons |

Syrup Brix (not determined)
Syrup Refractometer Brix (not determined)
Sodium Benzoate content of Concentrate = 1/20 of 1%

When diluted with 6 volumes of water per volume of this concentrate, a 10 ounce beverage concentration serving will contain about 1.5 grams of methylcellulose per 10 ounce serving.

Concentrate formulations prepared with a variety of cellulose ether products and viscosity grades are set forth in the following examples reported in Tables 10, 11, 12 and 13. The concentrate formulations are prepared using the same stirring rates and times indicated hereinabove for preparing concentrate formulations with the methylcellulose grades reported.

TABLE 10

| 1-4 Concentrate | |
|---|---|
| CS-42, 71° | 58.5 gallons |
| Methocel A15LV Premium (Methylcellulose 15 cps grade) | 42.328 lbs. |
| Water | 36.4 gallons |
| Sodium Citrate, Anhydrous FCC | 6.56 lbs. |
| Sodium Benzoate FCC | 0.514 lbs. |
| Citric Acid, Anhydrous | 9.94 lbs. |
| No. 812921 Natural Orange Cloud ® Flavor | 1. gal. (36.5 fl. ozs.) |
| Yield | 100 Gallons |

Syrup Brix 50.95
Syrup Refractometer Brix 50.18
Finished Beverage Brix 12.0
Sodium Benzoate content of concentrate = 1/20 of 1%

This concentrate formulation, when diluted with 4 volumes of water to 1 volume of concentrate will provide about 1.5 grams of cellulose ether fiber per 10 ounce serving.

TABLE 11

| 1-4 Concentrate | |
|---|---|
| HFCS-42, 71° | 52.35 gallons |
| Methocel E15LV Premium (Hydroxypropyl Methylcellulose 15 cps grade) | 21.164 lbs. |

TABLE 11-continued

| 1-4 Concentrate | |
|---|---|
| Water | 44.05 gallons |
| Sodium Citrate, Anhydrous FCC | 6.56 lbs. |
| Sodium Benzoate FCC | 0.514 lbs. |
| Citric Acid, Anhydrous | 9.94 lbs. |
| No. 812921 Natural Orange | 1. gal. (36.5 fl. ozs.) |
| Cloud ® Flavor | |
| Yield | 100 Gallons |

Syrup Brix 45.4
Syrup Refractometer Brix 44.77
Finished Beverage Brix 10.5
Sodium Benzoate content of concentrate = 1/20 of 1%

This concentrate formulation, when diluted with 4 volumes of water to 1 volume of concentrate will provide about 3 grams of cellulose ether fiber.

TABLE 12

| 1-4 Concentrate | |
|---|---|
| CS-42, 71° | 52.35 gallons |
| Methocel F50LV Premium (Hydroxypropyl Methylcellulose 50 cps grade) | 21.164 lbs. |
| Water | 44.05 gallons |
| Sodium Citrate, Anhydrous FCC | 6.56 lbs. |
| Sodium Benzoate FCC | 0.514 lbs. |
| Citric Acid, Anhydrous | 9.94 lbs. |
| No. 812921 Natural Orange | 1. gal. (36.5 fl. oz.) |
| Cloud ® Flavor | |
| Yield | 100 Gallons |

Syrup Brix 45.4
Syrup Refractometer Brix 44.77
Finished Beverage Brix 10.5
Sodium Benzoate content of concentrate = 1/20 of 1%

This concentrate formulation is used by diluting 1 part concentrate with 4 parts of water.

TABLE 13

| 1-4 Concentrate | |
|---|---|
| HFCS-42, 71° | 52.35 gallons |
| Methocel K100LV Premium (Hydroxypropyl Methylcellulose) | 21.164 lbs. |
| Water | 44.05 gallons |
| Sodium Citrate, Anhydrous FCC | 6.56 lbs. |
| Sodium Benzoate FCC | 0.514 lbs. |
| Citric Acid, Anhydrous | 9.94 lbs. |
| No. 812921 Natural Orange | 1. gal. (36.5 fl. oz.) |
| Cloud ® Flavor | |
| Yield | 100 Gallons |

Syrup Brix 45.4
Syrup Refractometer Brix 44.77

This concentrate formulation is used by diluting 1 part concentrate with 4 parts water.

While this invention has been disclosed with reference to specific embodiments, it is apparent that other embodiments and equivalent variations of this invention may be devised by those skilled in the art without departing from the true spirit and scope of this invention. The appended claims are intended to be construed to include all such embodiments and equivalent variations.

What is claimed is:

1. A process for preparing a dietary fiber supplement aqueous liquid, water-dilutable, concentrate composition containing about 1.0 to about 5.0 percent w/v of cellulose ether fiber which comprises,
    (a) mixing a water soluble cellulose ether having a viscosity rating of 3 to about 1500 cps. with a high density liquid diluent in proportions ranging from about 1 to 4 parts by volume, of said high density liquid diluent to one part by weight of said cellulose ether and in an amount sufficient to provide 1.0 to about 5.0 percent w/v concentration of cellulose ether fiber in the finished concentrate composition, at a stirring rate of from about 200 to 1000 RPM for a time sufficient to obtain a substantially uniform mixture of said cellulose ether and said high density liquid diluent,
    (b) mixing water with the mixture from step (a) while stirring the mixture at a rate from about 200 to 1000 RPM in an amount of water and for a time sufficient to provide a substantially homogenous concentrate composition having long-term shelf stability storage properties, which concentrate composition, when diluted with at least 3 volumes of water per volume of the concentrate composition up to a volume of dilution water which provides a resulting end product beverage composition of practical acceptability containing from about 1 to 4 grams and from about 0.3 to about 1.3 weight percent of cellulose ether fiber per 10 ounce serving of said resulting beverage strength composition.

2. The process according to claim 1, wherein in step (b) the mixture from step (a) is mixed with from 3 to 6 parts of water per part of the step (a) mixture, by volume, to prepare said concentrate composition.

3. The process according to claim 1, wherein the high density liquid diluent is selected from the group consisting of high fructose corn syrup, olive oil, vegetable oil and glycerine.

4. The process according to claim 3, wherein the high density liquid diluent is high fructose corn syrup (HFCS).

5. A concentrate composition prepared by the process of claim 3.

6. The process according to claim 1, wherein in step (a) at least one additive selected from the group consisting of an antioxidant, a preservative, an acidulant, a flavoring agent, a stabilizer and mixtures thereof is added to the mixture of the cellulose ether and the high density liquid diluent while stirring at from about 200 to 1000 RPM for a time sufficient to obtain a substantially uniform mixture.

7. The process according to claim 6, wherein in step (a) and in step (b) the mixture is stirred at a rate from about 250 to 500 RPM.

8. The process according to claim 7, wherein in step (b) sufficient water is added to prepare a concentrate composition for packaging, which packaged concentrate will be labeled with instructions for dilution of the concentrate composition with about 4 volumes of water for each volume of concentrate in preparing a resulting beverage composition for consumption by a patient.

9. A concentrate composition prepared by the process of claim 8.

10. The process according to claim 7, wherein in step (b), sufficient water is added to prepare a concentrate composition for packaging, which packaged concentrate will be labeled with instructions for dilution of this concentrate composition with about 5 volumes of water for each volume of concentrate in preparing the resulting beverage composition for consumption by the patient.

11. A concentrate composition prepared by the process of claim 6.

12. The process according to claim 1, wherein in step (a) the water soluble cellulose ether is selected from the group consisting of methylcellulose and hydroxypropyl methylcellulose.

13. A concentrate composition prepared by the process of claim 12.

14. A concentrate composition prepared by the process of claim 1.

15. A process for preparing individual packaged servings of a dietary fiber supplement beverage composition containing from about 0.3 to 1.3 weight percent of cellulose ether fiber and from about 1 gram to about 4 grams of said cellulose ether fiber per ten ounce serving, which comprises:
   (a) mixing a water soluble cellulose ether having a viscosity rating of 3 to about 1500 cps with a high density liquid diluent in proportions ranging from about 1 to 4 parts by volume, of said high density liquid diluent to one part by weight, of said cellulose ether at a stirring rate of from about 200 to 1000 RPM for a time sufficient to obtain a substantially uniform mixture of said cellulose ether and said high density liquid diluent;
   (b) while continuing to maintain essentially the same stirring rate, adding to said mixture from step (a) at least one additive selected from the group consisting of an antioxidant, a preservative, an acidulant, a flavoring agent, a stabilizer and mixtures thereof to the mixture of the cellulose ether and the high density liquid diluent;
   (c) mixing water with the mixture from step (b) in an amount sufficient to provide a beverage composition while stirring the mixture at a rate from about 200 to 1000 RPM for a time sufficient to provide a substantially uniform beverage composition;
   (d) packaging the beverage composition from step (c) into individual serving package containers;
   (e) pasteurizing the beverage composition in the packaging containers; and
   (f) cooling the resulting pasteurized beverage composition to a temperature at least as low as 50° F. and maintaining such temperature for a time necessary to prepare a beverage composition with shelf storage stability for extruded periods of time.

16. The process according to claim 15, wherein the high density liquid diluent is selected from the group consisting of high fructose corn syrup, olive oil, vegetable oil and glycerine.

17. The process according to claim 15, wherein in step (a) the water soluble cellulose ether is selected from the group consisting of methylcellulose and hydroxypropyl methylcellulose.

18. The process according to claim 17, wherein said water soluble cellose ether has a viscosity rating of from about 50 to 1000 cps.

19. A dietary fiber supplement beverage composition prepared by the process of claim 18.

20. A dietary fiber supplement beverage composition prepared by the process of claim 15.

21. A dietary fiber supplement beverage composition comprising a homogeneous aqueous mixture of a high density liquid diluent, a water soluble cellulose ether having a viscosity rating of 3 to about 1500 cps and water, said high density liquid being present in an amount of from about 1 to 4 parts by volume to 1 part by weight of said cellulose ether and said composition containing an amount of water sufficient to provide a consumable beverage composition containing from about 1 to 4 grams of cellulose ether dietary fiber per beverage dosage of about 10 ounces.

22. The dietary fiber supplement beverage composition according to claim 21, wherein said high density liquid diluent is selected from the group consisting of high fructose corn syrup, olive oil, vegetable oil, and glycerine.

23. The dietary fiber supplement beverage composition according to claim 21, wherein said water soluble cellulose ether is selected from the group consisting of methylcellulose and hydroxypropyl methylcellulose.

* * * * *